Figure 1:
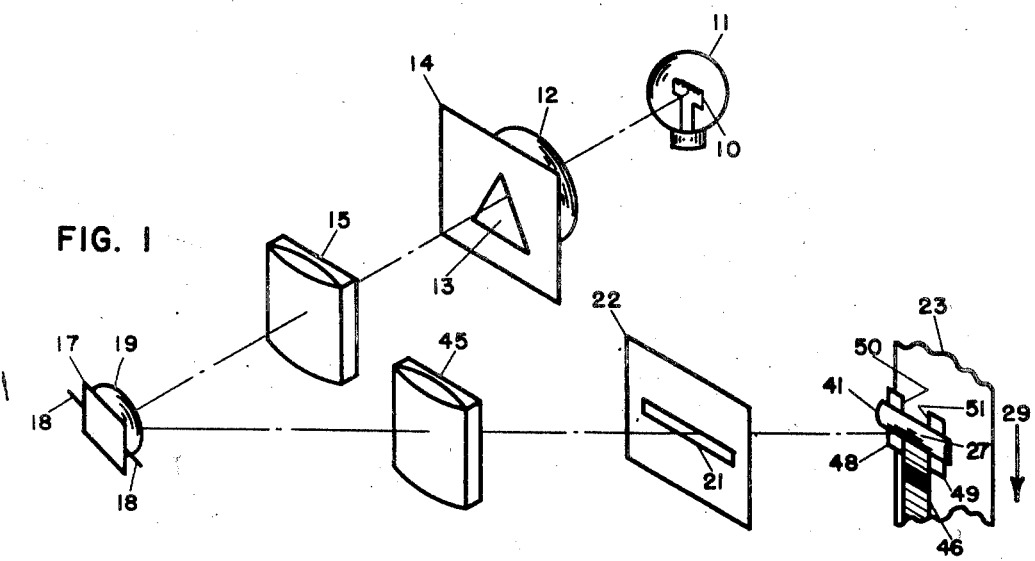

Feb. 21, 1950  J. A. MAURER, JR  2,497,952

VARIABLE DENSITY RECORDING OPTICAL SYSTEM

Original Filed Aug. 2, 1940  2 Sheets-Sheet 1

*INVENTOR:*
JOHN A. MAURER, JR.
BY Otto J. Nathansohn
AGENT

Feb. 21, 1950     J. A. MAURER, JR     2,497,952
VARIABLE DENSITY RECORDING OPTICAL SYSTEM
Original Filed Aug. 2, 1940     2 Sheets-Sheet 2
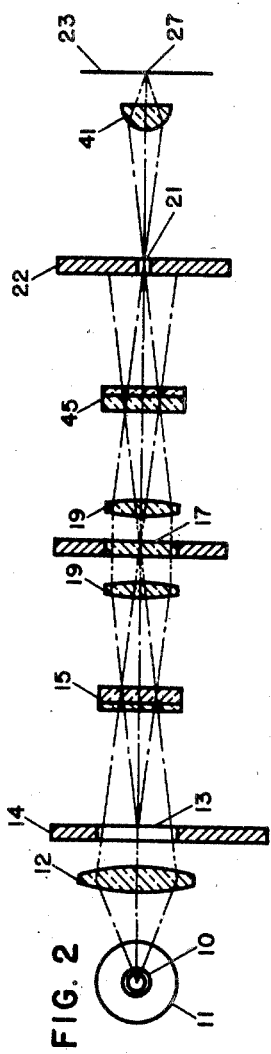
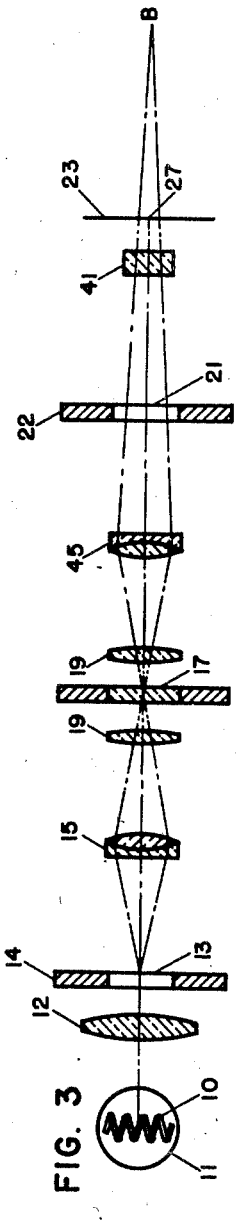
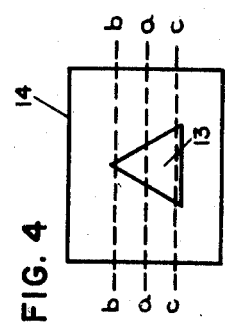
*INVENTOR:*
JOHN A. MAURER, JR.
BY
AGENT Patented Feb. 21, 1950

2,497,952

UNITED STATES PATENT OFFICE 2,497,952

VARIABLE DENSITY RECORDING OPTICAL SYSTEM

John A. Maurer, Jr., New York, N. Y., assignor to J. A. Maurer, Inc., Long Island City, N. Y., a corporation of New York Application November 21, 1944, Serial No. 564,451, which is a division of application Serial No. 349,515, August 2, 1940. Divided and this application October 31, 1946, Serial No. 706,929

3 Claims. (Cl. 88—24)

This invention relates to optical systems for the photographic recording of electrical impulses on a moving film such as are used in sound recording, picture transmission, and the like, and this application is a division of my application Serial No. 564,451, filed November 21, 1944, as a division of my application Serial No. 349,515, filed August 2, 1940; applications Serial No. 349,515 and Serial No. 564,451 being also assigned to J. A. Maurer, Inc., a corporation of New York, application Serial No. 349,515 now being abandoned, and application Serial No. 564,451 now being Patent No. 2,426,367, granted August 26, 1947.

More particularly, the invention relates to optical systems of the class referred to above wherein a small mirror vibrated by an oscillograph galvanometer, or a similar device for translating electrical impulses into mechanical vibrations, modulates a light beam in accordance with the electrical impulses to be recorded. The mirror oscillograph recording optical systems known heretofore, however, have the disadvantage that the light flux from the recording light source, such as the filament of an incandescent lamp, is not efficiently utilized therein. This unfavorable condition is due to the fact that the aperture of the oscillograph mirror is the limiting aperture in the two co-ordinate planes of the known optical systems, and that it cannot be enlarged beyond a certain degree since the physical size of the mirror must be comparatively small in order to avoid distortions due to its mass. For a given light source, therefore, the amount of light flux reaching the moving film is unduly limited in those optical systems, and this limitation makes itself particularly felt when filters are used at some position in the optical system, for example, for selecting light rays of a certain wave length, or for other purposes.

Another drawback of the known mirror oscillograph recording optical systems is that a portion of the light flux from the recording light source is not effectively prevented therein from falling on parts other than the oscillograph mirror, or on the structure housing the optical system. This portion of the light flux is to some extent reflected diffusely, thus forming stray light even though the surfaces on which it is incident may be black. Such stray light is objectionable because it may cause an additional exposure of the moving film, which should be exposed only to light flux modulated by the oscillograph mirror.

Still more particularly, the invention relates to mirror oscillograph recording optical systems by means of which the impulse records are produced as tracks of constant width but varying density. Such tracks are known as variable density tracks.

In the known variable density recording optical systems of the mirror oscillograph type the variable density effect is obtained by an imagery which is even less efficient than the imagery described hereinabove as being generally employed in the prior art mirror oscillograph recording optical systems. Alternatively, the variable density effect is obtained by the use of additional parts such as graded screens, penumbra stops, or the like. But it is difficult to manufacture graded screens which have a sufficiently accurate gradation, and the use of penumbra stops all but excludes certain modifications of the optical system which are highly desirable from the standpoint of producing impulse records with superior fidelity.

It is, therefore, an object of the present invention to provide a variable density recording optical system of the mirror oscillograph type wherein the variable density effect is obtained solely by means of an efficient imagery.

Another object of the invention is the provision of such an optical system which is highly efficient as regards the utilization of the light flux from the recording light source.

Another object of the invention is the provision of such an optical system whose limiting aperture in the one of its co-ordinate planes can be made much larger than the aperture of the oscillograph mirror.

Another object of the invention is the provision of such an optical system wherein the formation of stray light is reduced to a negligible amount.

Another object of the invention is the provision of such an optical system wherein a linear relation may easily be established between the electrical impulses to be recorded and the light transmission of the track used for their reproduction.

Another object of the invention is the provision of such an optical system which is particularly satisfactory as regards ease of manufacture and convenience of adjustment.

More specifically, however, it is an object of the invention to provide a variable density recording optical system of the mirror oscillograph type which embodies the features recited above, and which may be built at materially reduced cost.

A further object of the invention is the provision of such an optical system which may be built with small physical size and great compactness.

Still other objects of the invention include those which are hereinafter stated or apparent, or which are incidental to the invention.

In the optical system according to the invention, the oscillograph mirror is adapted to vibrate about a horizontal axis while the film moves past the recording point in a substantially vertical direction, the recording point being the point at which the optical axis of the system strikes the film. The optical system also has means for forming a uniformly illuminated light spot whose horizontal extension varies in a vertical direction, and means effecting an imagery of this light spot which is different in the two co-ordinate planes of the optical system: In the vertical plane, the light spot is conjugate to the recording point while, in the horizontal plane, it is conjugate to a position other than the recording point so that the recording point is conjugate to the light spot in only the vertical plane. By virtue of this imagery, a variable density effect is obtained at the recording point.

The imagery of the light spot is effected by a first set of imaging means with respect to which the light spot and the recording point are conjugate in the vertical plane, and a second set of imaging means with respect to which the light spot and said position are conjugate in the horizontal plane. The first set of imaging means includes a first imaging means which acts in the vertical plane, and a second imaging means which acts in only the vertical plane. The first imaging means is placed in front of the oscillograph mirror and has one of its conjugate foci at the light spot and the other substantially at a horizontal slit positioned between the mirror and the recording point, and the second imaging means has one of its conjugate foci at the slit and the other at the recording point.

The second set of imaging means includes third and fourth imaging means both of which act in only the horizontal plane. The third imaging means has one of its conjugate foci at the light spot and the other substantially at the oscillograph mirror so that an intermediate image of the light spot is formed substantially on the mirror. The fourth imaging means, in its turn, has one of its conjugate foci at the intermediate image and the other at said position. When then the oscillograph mirror vibrates about its horizontal axis, a variable density track is produced on the film as it moves past the recording point in a substantially vertical direction.

The means for forming the light spot, furthermore, include a recording light source and a screen with an opening hose horizontal extension varies in a vertical direction. The opening is uniformly illuminated by light flux from the light source, and its intermediate image is formed substantially on the oscillograph mirror as has been explained in the preceding paragraph. At the same time, an image of the light source is formed substantially on the mirror by the action of a condenser lens in the vertical plane. In this manner, substantially all the light flux entering the optical system through the opening is controlled by the oscillograph mirror whereby the formation of stray light is reduced to a negligible amount.

The cost of building the optical system according to the invention, finally, may be materially reduced by substituting for the above mentioned third and fourth imaging means a single imaging means which likewise acts in only the horizontal plane. To that end, the light beam proceeding through the optical system is made to strike the oscillograph mirror at an angle which is so small that the single imaging means can be traversed by both the incident and reflected parts of the light beam. The single imaging means then forms the intermediate image of the light spot substantially on the mirror and, simultaneously, images the intermediate image at the position other than the recording point. The angle at which the light beam strikes the mirror, is made sufficiently small preferably by folding the incident part of the light beam whereby, at the same time, a very compact mechanical structure is obtained for the optical system.

In the foregoing brief explanation of the state of the art and summary of the invention, and throughout the present specification, the term "co-ordinate planes" designates two planes at right angles to each other whose line of intersection is the optical axis of the system. The horizontal plane is the co-ordinate plane which contains the axis of the oscillograph mirror and the slit, while the vertical plane is the co-ordinate plane at right angles to the horizontal plane. The plane of the slit, finally, is the plane which contains the slit, and is at right angles to both the vertical and horizontal planes.

In the present specification, the term "vertical" and "horizontal" thus are not used in any absolute sense but merely in order to distinguish between two planes, or directions, at right angles to one another, and choice between those terms has been determined solely by convenience in description and illustration.

The invention will be better understood when the following description is considered with the accompanying drawings of certain presently preferred embodiments thereof, and its scope will be pointed out in the appended claims.

In the drawings:

Fig. 1 is a diagrammatic perspective view of an optical system embodying the invention, Fig. 2 is a diagrammatic longitudinal section in the vertical plane of the optical system shown in Fig. 1, the optical axis being represented as a straight line and an oscillograph mirror as an aperture, Fig. 3 is a corresponding section in the horizontal plane, Fig. 4 is an elevation of a part of the optical system of Figs. 1 to 3, and Fig. 5 is a diagrammatic longitudinal section in the vertical plane of a modification in which two cylindrical lenses shown in Figs. 1 to 3 have been replaced by a single cylindrical lens.

Referring first to Figs. 1 to 3, the novel variable density recording optical system has a light source such as the filament 10 of an incandescent lamp 11. A triangular opening 13 in a screen 14 is uniformly illuminated by light flux from lamp filament 10 so that a uniformly illuminated triangular light spot is formed at screen 14. The light beam defined by lamp filament 10 and opening 13 proceeds through the optical system and is deflected by the mirror 17 of an oscillograph galvanometer (not shown) or similar device for translating electrical impulses into mechanical vibrations. It thus has a part which is incident from opening 13 upon mirror 17, and a part which is reflected from mirror 17 towards the recording point 27. Recording point 27 is the point at which the optical axis of the system strikes the film 23, and film 23 moves past recording point 27 in a substantially vertical direction as indicated by the arrow 29.

More particularly, opening 13 is an isosceles triangle whose base extends horizontally, and mirror 17 is adapted to vibrate about an axis 18—18 which likewise extends horizontally. Furthermore, a horizontal slit 21 is formed in a screen 22 which is placed between mirror 17 and recording point 27.

A spherical condenser lens 12 is placed between lamp 11 and screen 14, and a cylindrical lens 15 which has its cylinder axis vertical, is placed between screen 14 and mirror 17. In front of mirror 17 there is placed a spherical lens 19 which acts on the reflected as well as the incident part of the light beam proceeding through the optical system. A second cylindrical lens 45 which also has its cylinder axis vertical, is placed between mirror 17 and screen 22, while a third cylindrical lens 41 has its cylinder axis horizontal and is placed between screen 22 and recording point 27.

These five imaging means have focal lengths relative to the other parts of the optical system as follows (see Figs. 2 and 3):

Spherical lens 12 has one of its conjugate foci at lamp filament 10, and the other substantially at mirror 17, that is, either on mirror 17 or at a position close thereto. Cylindrical lens 15 has one of its conjugate foci at opening 13, and the other substantially at mirror 17 so that an intermediate image of opening 13 is formed substantially on mirror 17. Spherical lens 19 has one of its conjugate foci at opening 13, and the other substantially at slit 21. Cylindrical lens 45 has one of its conjugate foci at the intermediate image of opening 13, and the other at a position B beyond recording point 27. Cylindrical lens 41, finally, has one of its conjugate foci at slit 21, and the other at recording point 27.

By virtue of the arrangement described hereinabove of its various parts, the following imagery is performed in the optical system of Figs. 1 to 3:

In the vertical plane (Fig. 2), spherical lens 19 forms an image of the uniformly illuminated opening 13 in the plane of the horizontal slit 21, or in a plane close to this plane. The image of opening 13 moves vertically across slit 21 when mirror 17 vibrates about the horizontal axis 18—18. As much of slit 21 as is illuminated by the image of opening 13, is imaged at recording point 27 by cylindrical lens 41 which is the sole means in the optical system for imaging slit 21 at recording point 27. There thus is formed at recording point 27 a horizontal line image of the illuminated portion of slit 21, and this line image has sharp and distinct horizontal boundaries. Likewise in the vertical plane, spherical lens 12 forms an image of lamp filament 10 substantially on mirror 17, thereby filling mirror 17 with light and also aiding in the uniform illumination of opening 13 by lamp filament 10.

In the horizontal plane (Fig. 3), cylindrical lens 15 forms substantially on mirror 17 the intermediate image of opening 13, and an image of the intermediate image is formed by cylindrical lens 45 at position B. Since position B is beyond recording point 27, the light flux acted upon by cylindrical lenses 15 and 45 arrives at recording point 27 in a diffused condition so that it is spread out within the horizontal boundaries of the line image formed at recording point 27 by the action of cylindrical lens 41 in the vertical plane.

Lenses 12 and 19 are spherical and hence have power in the horizontal as well as in the vertical plane. But their actions in the horizontal plane can be disregarded for the following reasons:

On account of its position and relative focal length, spherical lens 12 tends to image lamp filament 10 substantially on mirror 17 also in the horizontal plane. The action, however, of cylindrical lens 15 interferes with this imagery to such an extent that it becomes immaterial for attaining the objects of the present invention. On the other hand, the power of spherical lens 19 in the horizontal plane has no effect upon the actions of cylindrical lenses 15 and 45 on account of the proximity of spherical lens 19 to mirror 17 which is, in the horizontal plane, substantially at a common focus of cylindrical lenses 15 and 45. No actions therefore, of spherical lenses 12 and 19 have been indicated in Fig. 3.

Cylindrical lenses 15 and 45, in their turn, do not interfere with the imagery in the vertical plane since they have their cylinder axes vertical, and hence act in only the horizontal plane. Correspondingly, cylindrical lens 41 does not interfere with the imagery in the horizontal plane since it has its cylinder axis horizontal, and hence acts in only the vertical plane.

It will thus be seen that the imagery performed in the horizontal plane of the optical system of Figs. 1 to 3 differs from the imagery performed in its vertical plane in that recording point 27 is conjugate to opening 13 in only the latter plane. The effect of this difference in imagery upon the line image formed at recording point 27 is as follows:

In the vertical plane, horizontal slit 21 is, with respect to spherical lens 19, conjugate to a horizontal line through opening 13, for example, the broken line $a$—$a$ shown in Fig. 4. Since, furthermore, recording point 27 is in the vertical plane conjugate to slit 21 with respect to cylindrical lens 41, it is also conjugate to line $a$—$a$. The line image at recording point 27 hence is an image of line $a$—$a$ as far as its vertical extension, or width, is concerned, and it is, according to a well known property of conjugates, made up of the light flux emanating from line $a$—$a$. Since, however, this light flux is, in the horizontal plane, diffused at recording point 27, the line image is not sharply defined at its ends. The light flux contained in the line image consequently decreases at its ends, but it is evently distributed over its central portion. This central portion thus is uniformly illuminated, and its illumination is directly and linearly proportional to the horizontal extension, or length, of line $a$—$a$. When, therefore, the horizontal line through opening 13 is short— as is, for example, the broken line $b$—$b$ in Fig. 4— the central portion of the line image is dim, while it is bright when that horizontal line is long— as is, for example, the broken line $c$—$c$ in Fig. 4. (The illumination of any horizontal line through opening 13 is, of course, uniform since opening 13 is uniformly illuminated.)

The particular horizontal line through opening 13 to which recording point 27 is conjugate, is determined by the angle of inclination of mirror 17. Normally, mirror 17 is adjusted so that at its rest position, that is, when no electrical impulses are applied to the oscillograph galvanometer on which it is mounted, recording point 27 is conjugate to line $a$—$a$, which line passes through opening 13 halfway between its tip and its base. When then the electrical impulses to be recorded are applied in known manner to the oscillograph galvanometer, mirror 17 vibrates in accordance therewith about the horizontal axis 18—18 and in such a manner that, when the amplitude of its vibration is a maximum, recording point 27 is conjugate to line $b$—$b$ at the one extreme of its motion and to line $c$—$c$ at the other extreme thereof. The illumination of the central portion of the line image at recording point 27 hence varies in accordance with the vibration of mirror 17 and, therefore, the electrical impulses to be recorded. A variable density track 46 thus is produced on film 23 as it moves past recording point 27.

But the vibration of mirror 17 varies also the horizontal extension, or length, of the central portion of the line image, and when the minimum length of the central portion is less than the desired horizontal extension, or width, of the variable density track 46, distortions are introduced into track 46. In order to avoid these distortions, it is necessary to control the minimum length of the central portion by suitably choosing the focal length of cylindrical lens 45 and thereby the distance of position B from recording point 27. Track 46 is undistorted, for example, when the ratio of the distance of position B from recording point 27 to the distance of position B from cylindrical lens 45 is at least as great as the ratio of the desired width of track 46 to the aperture of cylindrical lens 45.

As has been explained hereinabove, the line image at recording point 27 is not sharply defined at its ends. The edges of the variable density track 46 hence are blurred and should be screened off when prints are made of track 46 so as to restrict the width of track 46 to its desired value. Such screening off now is commonly practiced in the printing from variable density tracks. If, however, it is desired to eliminate the blurred edges when producing track 46 on film 23, two screens 48 and 49 having a vertical edges 50 and 51, respectively, or similar means, may be employed. As shown in Fig. 1, screens 48 and 49 are placed between cylindrical lens 41 and recording point 27, and are spaced apart so that edges 50 and 51 confine between themselves the desired minimum length of the central portion of the line image at recording point 27.

The illumination of the central portion of the line image at recording point 27 varies in accordance with the vibration of mirror 17 not only when cylindrical lens 45 has one of its conjugate foci at position B but, quite in general, whenever a position other than recording point 27 is, in the horizontal plane, conjugate to opening 13. Whenever this condition is fulfilled, the variable density track 46 is produced on film 23. For example, cylindrical lens 45 may have one of its conjugate foci also at some position, including slit 21, between lens 45 and recording point 27, or it may have it at infinity, in which case the light beam leaving lens 45 is parallel.

In all cases in which the position other than recording point 27, referred to in the preceding paragraph, is also a position other than slit 21— as is, for example, position B— the image of opening 13 formed substantially in the plane of slit 21 is a light spot of vertically varying illumination. When, however, slit 21 is conjugate to opening 13 with respect to cylindrical lenses 15 and 45, this image is a uniformly illuminated triangular light spot. The formation of the latter light spot in the plane of slit 21 facilitates the visual adjustment of the optical system and also the visual monitoring of the recording done with it, but is otherwise immaterial for attaining the objects of the invention.

The present invention thus provides a variable density recording optical system of the mirror oscillograph type in which the variable density effect is obtained solely by means of a novel imagery and without the use of additional parts such as graded screens, penumbra stops, or the like. At the same time, the novel imagery brings it about that the light flux from lamp filament 10 is utilized at recording point 27 in a highly efficient manner, as will be seen from the following considerations:

As has been pointed out hereinabove, the light flux from lamp filament 10 is first employed for the uniform illumination of opening 13. In the horizontal plane, which plane contains the horizontal axis 18, 18 of mirror 17, an intermediate image of opening 13 then is formed by cylindrical lens 15 substantially on mirror 17, and this intermediate image is imaged by cylindrical lens 45 at a position other than recording point 27, for example, position B. Mirror 17 thus is in the horizontal plane substantially at a common focus of cylindrical lenses 15 and 45. For any given angle of inclination of mirror 17, therefore, the amount of light flux from opening 13 which arrives at recording point 27, is limited in the horizontal plane by the aperture of cylindrical lens 45 rather than the aperture of mirror 17. To cylindrical lens 45, however, there may be given an aperture which is as much as five times as great as the aperture which it is practical to give to mirror 17.

This is a marked advance over the mirror oscillograph recording optical systems of the prior art wherein the light flux from the entrance position corresponding to opening 13 is diffused at the oscillograph mirror in the two co-ordinate planes so that the mirror aperture is the limting aperture of the optical systems also in their horizontal plane. Since the physical size of the oscillograph mirror must be comparatively small in order to avoid distortions due to its mass, the above condition has been a serious obstacle to an efficient utilization of the light flux in those optical systems. The advantage gained in this respect by the optical system of Figs. 1 to 3 is considerable because, as is well known to those skilled in the art, the efficiency with which the light flux from a given light source is utilized in an optical system, is approximately proportional to the product of the limiting apertures in its two co-ordinate planes.

Another advantage of having mirror 17 substantially at a common focus of two imaging means which act in only the horizontal plane, is that small deviations of mirror 17 about a vertical axis have a negligible effect on the imagery in the horizontal plane. Mirror 17 need therefore be accurately adjusted only about the horizontal axis 18—18. This greatly increases the ease of adjustment of the optical system, and is particularly important when it is necessary to replace the oscillograph galvanometer on which mirror 17 is mounted.

A further advantage of the novel imagery embodied, by way of example, in the optical system of Figs. 1 to 3 resides in the fact that there is formed substantially on mirror 17 an image of lamp filament 10 by the action of spherical lens 12 in the vertical plane, and, simultaneously, the intermediate image of opening 13 by the action of cylindrical lens 15 in the horizontal plane. It thus is possible so to control the light flux which enters the optical system through opening 13 that it is all incident within the working aperture of mirror 17. This result is best obtained when the focal length of spherical lens 12 and the position of lamp 11 are chosen so that the image of lamp filament 10 has a vertical dimension no larger than that of mirror 17, and when the focal length of cylindrical lens 15 and the position of screen 14 are chosen so that the largest horizontal dimension of the intermediate image is no larger than the horizontal dimension of mirror 17. If these conditions are fulfilled, all the light flux passing through opening 13 is subject to control by mirror 17, whereby the formation of stray light in the optical system is reduced to a negligible amount.

The employment, finally, of cylindrical lens 41 in the portion of the optical system between screen 22 and recording point 27 has certain inherent advantages: Cylindrical lens 41 may have a short focal length so that the optical system may be built with small physical size. Moreover, a cylindrical lens of short focal length is less expensive than a spherical lens system well enough corrected to form, over the same distance, an equally sharp line image. The optical system of Figs. 1 to 3 may hence be built with greater compactness and at less cost than the variable density recording optical systems of the mirror oscillograph type known heretofore.

The cost of building an optical system according to the invention may be further reduced by making the light beam defined by lamp filament 10 and opening 13 strike mirror 17 at a small angle. It then is possible to substitute a single cylindrical lens 71 for the two cylindrical lenses 15 and 45 of Figs. 1 to 3. Like cylindrical lenses 15 and 45, cylindrical lens 71 has its cylinder axis vertical, and it is placed so as to be traversed by the reflected as well as the incident part of the light beam deflected by mirror 17. The relative focal length of cylindrical lens 71 is chosen so that opening 13 and a position on, or close to, mirror 17 are conjugate with respect to cylindrical lens 71 on the incident part, and this position and position B, or an equivalent position, are conjugate with respect to cylindrical lens 71 on the reflected part of the light beam. In this manner, cylindrical lens 71 forms the intermediate image of opening 13 substantially on mirror 17 and, simultaneously, images the intermediate image at a position other than the recording point 27.

One way of making the angle at which the light beam strikes mirror 17, sufficiently small consists in considerably lengthening the optical system mechanically. But, while such an arrangement materially reduces the cost of building the optical system on account of the replacement of two cylindrical lenses by a single cylindrical lens, it sacrifices the compactness of its mechanical structure. The latter disadvantage is overcome in, and a very compact mechanical design of the optical system is provided by, the arrangement shown in Fig. 5 by way of example. In this arrangement, a reflecting prism 70 is placed between screen 14 and mirror 17 whereby the incident part of the light beam is folded so that it strikes mirror 17 at a small angle, and cylindrical lens 71 is traversed by both the incident and reflected parts of the light beam. In place of prism 70 there may be employed other suitable beam folding means such as mirrors, or the like.

Figure 5:
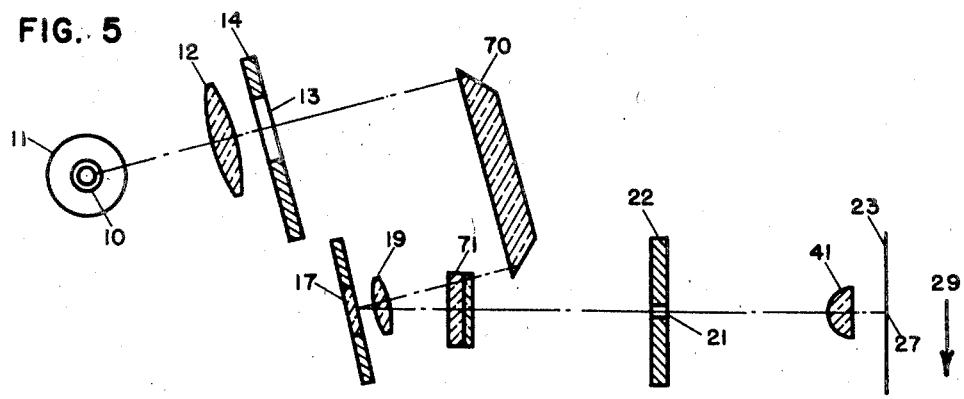

It will be understood by those skilled in the art that the optical system of Fig. 5 is susceptible to most of the modifications shown and described in Patent No. 2,426,367 with respect to the optical system of Figs. 1 to 3. The opening 13 in the screen 14, for example, may also in the optical system of Fig. 5 be replaced by any other opening whose horizontal extension varies in a vertical direction. For that reason, the openings shown in Figs. 5 to 8 of Patent No. 2,426,367 as provided in screen 14 may be employed in the optical system of Fig. 5 with the same result as in that of Figs. 1 to 3.

As in the optical system of Figs. 1 to 3, finally, the spherical condenser lens 12 and the spherical lens 19 may also in the optical system of Fig. 5 each be replaced by a cylindrical lens whose cylinder axis is horizontal, and which has the same focal length relative to the other parts of the optical system as the spherical lens it replaces; see Figs. 9 and 10 of Patent No. 2,426,367.

What is claimed is:

1. In a variable density recording optical system, the combination of light beam defining means which include a light source and a screen with an opening whose horizontal extension varies in a vertical direction, said opening being uniformly illuminated by said light source; a recording point past which a film may move in a substantially vertical direction; a mirror adapted to vibrate about a horizontal axis, said light beam being deflected by said mirror so as to have a part which is incident from said opening upo said mirror, and a part which is reflected from said mirror towards said recording point; and a cylindrical lens placed between said screen and said mirror and between said mirror and said recording point, said cylindrical lens having its cylinder axis vertical and being traversed by said incident and reflected parts; said opening and said mirror being conjugate with respect to said cylindrical lens on said incident part, and said mirror and a position other than said recording point being conjugate with respect to said cylindrical lens on said reflected part.

2. In a variable density recording optical system, the combination of light beam defining means which include a light source and a screen with an opening whose horizontal extension varies in a vertical direction, said opening being uniformly illuminated by said light source; a recording point past which a film may move in a substantially vertical direction; a mirror adapted to vibrate about a horizontal axis, said light beam being deflected by said mirror so as to have a part which is incident from said opening upon said mirror, and a part which is reflected from said mirror towards said recording point; means placed between said screen and said mirror for folding said incident part; and a cylindrical lens placed between said folding means and said mirror and between said mirror and said recording point, said cylindrical lens having its cylinder axis vertical and being traversed by said incident and reflected parts; said opening and said mirror being conjugate with respect to said cylindrical lens on said incident part, and said mirror and a position other than said recording point being conjugate with respect to said cylindrical lens on said reflected part.

3. In a variable density recording optical system, the combination of light beam defining means which include a light source and a screen with an opening whose horizontal extension varies in a vertical direction, said opening being uniformly illuminated by said light source; a recording point past which a film may move in a substantially vertical direction; a mirror adapted to vibrate about a horizontal axis, said light beam being deflected by said mirror so as to have a part which is incident from said opening upon said mirror, and a part which is reflected from said mirror towards said recording point; means placed between said screen and said mirror for folding said incident part; means placed between said mirror and said recording point, and forming a horizontal slit; a cylindrical lens placed between said folding means and said mirror and between said mirror and said slit forming means, said cylindrical lens having its cylinder axis vertical and being traversed by said incident and reflected parts; first imaging means placed in front of said mirror and acting in the vertical plane; and second imaging means placed between said slit forming means and said recording point and acting in only the vertical plane; said opening and said mirror being conjugate with respect to said cylindrical lens on said incident part, said mirror and a position other than said recording point being conjugate with respect to said cylindrical lens on said reflected part, said opening and said slit being conjugate with respect to said first imaging means, and said slit and said recording point being conjugate with respect to said second imaging means.

JOHN A. MAURER, Jr.

REFERENCES CITED

The following references are of record in the file of this patent:

UNITED STATES PATENTS

| Number | Name | Date |
| --- | --- | --- |
| 1,999,721 | Dimmick | Apr. 30, 1935 |
| 2,095,317 | Dimmick | Oct. 12, 1937 |
| 2,095,318 | Dimmick | Oct. 12, 1937 |
| 2,121,568 | Newcomer | June 21, 1938 |
| 2,157,166 | Dimmick | May 9, 1939 |
| 2,436,148 | Maurer | Feb. 17, 1948 |